United States Patent Office 3,629,439
Patented Dec. 21, 1971

3,629,439
USE OF 2,5-DINITRO-1,1-(SUBSTITUTED)-DIOXY-2,3,4,5 - TETRACHLORO-3-CYCLOPENTENES TO PROTECT PLANTS FROM SOIL FUNGI
Richard M. Scribner, Wilmington, Del., assignor to E. I. du Pont de Nemours and Company, Wilmington, Del.
No Drawing. Continuation-in-part of application Ser. No. 536,989, Mar. 24, 1966. This application Jan. 13, 1970, Ser. No. 2,648
Int. Cl. A01n 9/20, 9/24, 9/28
U.S. Cl. 424—278                                9 Claims

ABSTRACT OF THE DISCLOSURE

A method of controlling soil fungi with 2,5-dinitro-1,1-(substituted)-dioxy - 2,3,4,5 - tetrachloro - 3 - cyclopentenes and plant protectant compositions containing these cyclopentenes in combination with surfactants.

BACKGROUND OF THE INVENTION

This invention relates to the use of chemicals to protect plants from soil fungi. More specifically it relates to a method of protecting plants from soil fungi by applying to soil or seeds a plant protectant amount of a 2,5-dinitro - 1,1 - (substituted)dioxy - 2,3,4,5 - tetrachloro-3-cyclopentene.

These cyclopentenes are adducts of nitrogen dioxide and 1,1-(substituted)dioxy - 2,3,4,5 - tetrachlorocyclopentadienes. The 1,1-(substituted)dioxy-2,3,4,5-tetrachlorocyclopentadienes are known compounds. See Newcomer and McBee, J.A.C.S., 71, 946–51 (1949), Jaworski and Polaczkowa, Rocznike Chem., 34, 887 (1961), Chang, J.C.S., 1965, 4605, Chang, Chem. Ind. (London) 1964, (34), 1491, and Ordas, U.S. Pat. 2,697,103, Dec. 14, 1954.

RELATED APPLICATIONS

This application is a continuation-in-part of my application Ser. No. 536,989, filed Mar. 24, 1966 now U.S. Pat. 3,504,039.

SUMMARY OF THE INVENTION

This invention is a method of protecting plants from soil fungi which comprises applying to seeds of the plants or to soil in which the plants have been or will be planted a plant protectant amount of a compound of the following structure:

(I) 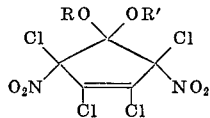

wherein: R and R' taken separately can be the same or different and are alkyl of 1 through 8 carbon atoms, allyl or benzyl; or taken together are an ethylene group.

The invention also includes fungicidal compositions containing, as an essential ingredient, at least one compound of Formula I, together with a surface active agent and/or an inert diluent.

DETAILED DESCRIPTION

The fungicidally active compounds used in this invention are adducts of nitrogen dioxide and 1,1-(substituted)-dioxy-2,3,4,5-tetrachlorocyclopentadienes and are prepared by reacting nitrogen dioxide, dinitrogen tetroxide or a mixture of nitrogen dioxide and dinitrogen tetroxide with the appropriate 1,1-(substituted)dioxy-2,3,4,5-tetrachlorocyclopentadiene, as shown in the following equation:

(II) 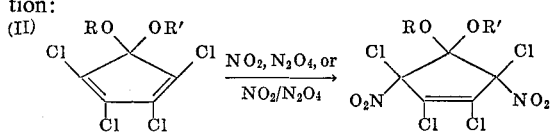

wherein: R and R' have the meaning indicated above.

The cyclopentadiene reactants are produced by reaction of alkanols of 1 through 8 carbon atoms, benzyl alcohol, allyl alcohol, or ethylene glycol, with hexachlorocyclopentadiene.

Either nitrogen dioxide ($NO_2$), dinitrogen tetroxide ($N_2O_4$) or a mixture of nitrogen dioxide and dinitrogen tetroxide can be used in preparing the 2,5-dinitro-1,1-(substituted)-dioxy-2,3,4,5-tetrachloro - 3 - cyclopentenes. These two oxides are in equilibrium. This equilibrium is strongly temperature dependent. In the solid state (M.P.—11.2° C.) the oxide is dinitrogen tetroxide, the vapor at 100° C. is 10% $N_2O_4$ and 90% $NO_2$ and the liquid is a solution of $NO_2$ in $N_2O_4$.

Addition of $NO_2$ or $N_2O_4$ to 1,1-(substituted)dioxy-2,3,4,5-tetrachlorocyclopentadienes takes place at temperatures of between 0 and 100° C. The reaction can be conducted at subatmospheric or superatmospheric pressures; however, it is convenient to run the reaction at atmospheric pressure. An inert diluent or solvent such as carbon tetrachloride, chloroform, ether, and 1,1,2,2-tetrafluoro-1,2-dichloroethane can be used. Reaction time for addition of $NO_2$ or $N_2O_4$ is from a few minutes to several hours.

The reaction of $NO_2$ or $N_2O_4$ with 1,1-(substituted)-dioxy-2,3,4,5-tetrachlorocyclopentadienes generally gives a small amount of 2,3 addition along with the usual 2,5 addition; the latter addition gives the main product, 2,5-dinitro-1,1-(substituted dioxy - 2,3,4,5 - tetrachloro-3-cyclopentene.

The compounds of Formula I are generally stable solids which can be isolated by removal of the reactants and solvents and by crystallization.

The following examples further illustrate the method of preparing compounds of Formula I. Temperatures in the examples are in degrees centigrade.

EXAMPLE I 1,1-dimethoxy-2,5-dinitro-2,3,4,5-tetrachloro-3-cyclopentene

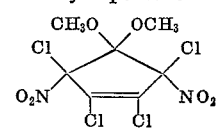

1,1-dimethoxy - 2,3,4,5 - tetrachlorocyclopentadiene, B.P. 108–111°/11 mm., was prepared by the method of Newcomer and McBee, J. Am. Chem. Soc., 71, 949 (1949). Two grams of this compound were dissolved in 75 ml. of carbon tetrachloride and 4 ml. (at 20°) of dinitrogen tetroxide were added to the solution which was then heated at gentle reflux for five hours under a cold-finger condenser maintained at about −20° C. The solvent was then evaporated in vacuo, giving 3.02 g. of colorless solid which was crystallized from methylene chloride-hexane to afford 0.78 g. of product $C_7H_6N_2O_6Cl_4$; M.P. 125–126°.

EXAMPLE II

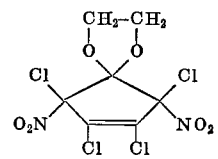

A solution of 1.0 g. of 1,1 - ethylenedioxy - 2,3,4,5-tetrachlorocyclopentadiene (prepared by the method of Chang, J. Chem. Soc., 1965, 2305) and 1.0 ml. (at 20°) of dinitrogen tetroxide in 25 ml. of carbon tetrachloride was allowed to stand for two days at room temperature. Evaporation of the reaction mixture under reduced pressure and addition of petroleum ether to the residue gave 0.51 g. of a product, M.P. 107–108°, after crystallization from hexane. An analytical sample, prepared by sublimation at 90°/0.1 mm., had M.P. 107–109°.

EXAMPLE III 1,1-diethoxy-2,5-dinitro-2,3,4,5-tetrachloro-3-cyclopentene

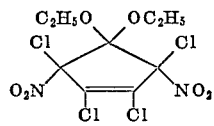

A solution of 1.0 g. of 1,1-diethoxy-2,3,4,5-tetrachlorocyclopentadiene [(prepared by the method of Newcomer and McBee (loc. cit.)] and 1.0 ml. (at 20°) of dinitrogen tetroxide in 25 ml. of carbon tetrachloride was allowed to stand at room temperature for two days and then evaporated under reduced pressure. The residue on trituration with petroleum ether gave 0.42 g. of a product which on crystallization from hexane melted at 67–74°; sublimation at 60°/0.1 mm., gave white crystals, M.P. 85.0–86.0° (sealed capillary).

EXAMPLES IV–VIII

In Examples IV–VIII substitution of A for 1,1-diethoxy - 2,3,4,5 - tetrachlorocyclopentadiene in Example III gives product B.

EXAMPLE IV (A) 1,1-di-n-butoxy-2,3,4,5-tetrachlorocyclopentadiene
(B) 2,5-dinitro-1,1-di-n-butoxy-2,3,4,5-tetrachloro-3-cyclopentene

EXAMPLE V (A) 1,1-dibenzyloxy-2,3,4,5-tetrachlorocyclopentadiene
(B) 2,5-dinitro-1,1-dibenzyloxy-2,3,4,5-tetrachloro-3-cyclopentene

EXAMPLE VI (A) 1,1-diallyloxy-2,3,4,5-tetrachlorocyclopentadiene
(B) 2,5-dinitro-1,1-diallyloxy-2,3,4,5-tetrachloro-3-cyclopentene

EXAMPLE VII (A) 1,1-dioctyloxy-2,3,4,5-tetrachlorocyclopentadiene
(B) 2,5-dinitro-1,1-dioctyloxy-2,3,4,5-tetrachloro-3-cyclopentene

EXAMPLE VIII (A) 1,1-diisopropoxy-2,3,4,5-tetrachlorocyclopentadiene
(B) 2,5-dinitro-1,1-diisopropoxy-2,3,4,5-tetrachloro-3-cyclopentene

COMPOSITIONS

Plant protectant compositions of this invention comprise one or more compounds of Formula I and one or more surface-active agents.

The surface-active agent or surfactant can include any of the anionic, cationic and non-ionic surface-active agents. Suitable surface-active agents are set out, for example, in "Detergents and Emulsifiers Annual" (1968) by John W. McCutcheon, Inc.

Among the more preferred surfactants are those anionic and non-ionic agents recognized in the art as wetting agents, detergents or emulsifiers. Among the anionic surfactants, preferred ones are alkali metal or amine salts of alkylbenzene sulfonic acids such as dodecylbenzene sulfonic acid, sodium lauryl sulfate, alkyl naphthalene sulfonates, sodium-N-methyl-N-oleoyltaurate, oleic acid ester of sodium isothionate, octyl sodium sulfosuccinate and sodium dodecyldiphenyl oxide disulfonate. Among the non-ionic compounds, the preferred members are alkylphenoxy poly(ethyleneoxy)ethanols such as nonyl phenol adducts with ethylene oxide; trimethylnonyl polyethylene glycol esters, polyethylene oxide adducts of fatty and rosin acids, long chain alkyl or mercaptan adducts with ethylene oxide.

Surfactants can be present in compositions in this invention in the range of 0.1 to 20% by weight. However, it is preferred to use 0.2 to 10% by weight of surfactant.

Low strength compositions containing 1 to 5% by weight of a compound of Formula I can contain, with or without surfactant present, common liquid solvents such as alcohols, ketones, chlorinated hydrocarbons, Cellosolves, aliphatic and aromatic hydrocarbons and N,N-dialkyl amides. Preferred liquid solvents include xylene, alkylated naphthalene, cyclohexane, cyclohexanone, chloroethanes and dimethyl formamide. These low strength compositions containing one or more of the above-mentioned solvents can be used for direct application to the soil.

Additionally, a compound of Formula I can be formulated into emulsifiable solutions containing 10 to 50% of active component by weight plus solvent and emulsifiers to make up 100%. The solvents can be water insoluble. Typical of the solvents used are higher ketones, aromatic hydrocarbons, chlorinated hydrocarbons and the like. Preferably, alkylated naphthalene, xylene, isophorone, or cyclohexanone alone or in combination is used.

Emulsifying agents most suitable for the compositions of this invention are alkylaryl polyethoxy alcohols, polyoxyethylene sorbitol or sorgitan fatty acid esters, polyethylene glycol fatty esters, fatty alkylol amide condensates, amine salts or fatty alcohol sulfates plus long chain alcohols and oil soluble petroleum sulfonates.

Additional compositions can be formulated by adding a free-flowing inert powder to the active agent.

Free-flowing inert powders can be any of the agricultural extenders commonly employed in the fungicide art. They can include inert finely divided diluents such as natural clays, including attapulgite or kaolinite, diatomaceous earth, pyrophylite, talc, synthetic mineral fillers derived from silica and silicates such as synthetic fine silica and synthetic calcium or magnesium silicate, carbonates, phosphates and sulfates, sulfur, lime and flours such as wood, walnut shell, redwood, soybeans and cottonseed.

Dust compositions contain 1 to 30% by weight of the active ingredient. However, 3 to 15% by weight is preferred.

Particle size of the extender can vary considerably but will ordinarily be somewhat under 50 microns in the finished formulation. Ureas and other fertilizers can be added to dust formulations to bring the concentration of active ingredient present down to 0.5 to 5% by weight of the total formulation.

In powdered compositions the active compound can be combined with the powder to form granules. Such granules can be prepared by spraying concentrated wettable powder slurries or solutions of the active ingredient in a liquid carrier over the surface of preformed clay granules or expanded vermiculite. It is also possible to mix finely divided clays with the finely divided compounds of Formula I, moisten the mixture and then granulate. In these compositions, the active compound ordinarily will be present at the rate of 1 to 25% by weight. However, 3 to 15% by weight is the preferred.

In wettable powder compositions containing the active ingredient, one or more surfactants and a free-flowing dust made up of small particles of the above-described powders, the active compound will ordinarily be present in a concentration in the range of 25 to 85% by weight. Surfactants will be present in a range from 0.1 to 10% by weight to obtain adequate wetting and dispersion in water, with the remainder being one or more of the finely divided diluents shown above.

Wettable powders are prepared by mixing the ingredients in a blender and grinding the mixture in a hammer mill, air-impact mill or the like until the particle size has been reduced to make spray application practical and easy.

Compositions of this invention can additionally contain known fungicides. Illustrative of some of these fungicides are:

p-Dimethylaminobenzenediazo sodium sulfonate;
Quinone oxyaminobenzooxohydrazone;
Tetraalkyl thiuram sulfides such as tetramethyl thiuram monosulfide or disulfide and tetraethyl thiuram monosulfide or disulfide;
Metal salts of ethylene bisdithiocarbamic acid, e.g. manganese, zinc, iron and sodium salts;
Pentachloronitrobenzene;
Dodecylguanidine acetate;
N-trichloromethylthiotetrahydrophthalimide (captan);
Phenylmercury acetate;
2.5-dichloro-1,4-dimethoxybenzene;
2,4-dichloro-6-(o-chloroaniline)-s-triazine;
N-methylmercury p-toluenesulfonanilide;
Chlorophenolmercury hydroxides;
Nitrophenylmercury hydroxides;
Ethylmercury acetate;
Ethylmercury 2,3-dihydroxypropyl mercaptide;
Methylmercury acetate;
Methylmercury 2,3-dihydroxypropyl mercaptide;
3,3'-Ethylenebis(tetrahydro-4,6-dimethyl-2H-1,3,5-thiadiazine-2-thione);
Methylmercury dicyandiamide;
N-ethylmercury-p-toluenesulfonilide
Metal (e.g. iron, sodium and zinc), ammonium and amine salts of dialkyl dithiocarbamic acids;
Tetrachloronitroanisole;
Hexachlorobenzene;
Hexachlorophene;
Methylmercury nitrile;
Tetrachloroquinone; and
N-trichloromethylthiophthalimide.

The above fungicides are are added to compositions containing the active ingredient used in this invention at the rate of 1 to 400 pounds to each 20 pounds of a compound within the scope of this invention. Illustrative of fungicides used at low rates with the active ingredients of this case are the above-described organo mercurials. Illustrative of fungicides used at high rates with the active ingredients of this case are thiuram sulfides and captan. Of course, more or less of the above-listed fungicides can be added to a composition of this invention depending on the fungi present in the area to be protected.

Compositions of this invention can additionally contain soil insecticides such as chlordane, DDT, dieldrin, endrin, aldrin, methoxychlor and others for control of insects in the soil. From 0.1 to 10 parts by weight of the insecticide is used for each one part by weight of a compound of Formula I.

Wettable powder formulations containing an insecticide and a compound of Formula I are blended with a diluent and a surfactant and then ground in a hammer mill to obtain intimately blended finely divided particles. This type formulation can be dispersed in water and sprayed in broadcast treatments followed by rotovation into the soil or sprayed in-the-furrow.

Dust compositions containing an insecticide and a compound of Formula I can be prepared by blending with a diluent and grinding in a hammer mill. These dust compositions can be applied to the soil in conventional dusting equipment in broadcast treatments, in-the-row treatments or as a hopper-box treatment as part of a seeding operation.

Insecticides can also be combined with compounds of Formula I in emulsifiable compositions by dissolving the insecticide and a compound of Formula I in an inert solvent containing an emulsifier. These compositions are emulsified in water and applied to the soil much like the wettable powders above.

The plant protectant compositions of this invention can also contain nematocides such as "Nemagon," 1,2-dibromo-3-chloropropane and "D-D," a mixture of dichloropropane and dichloropropene, in order to protect plants from a broader spectrum of nematodes. The above nematodes. The above nematocides are present in the range of 0.1 to 10 parts by weight for each one part by weight of a compound of Formula I. These combinations can be formulated in a manner similar to the compositions described above.

In addition compositions can contain special additives such as corrosion inhibitors, pigments, antifoam agents and the like.

APPLICATION

The compounds of Formula I prevent damage caused by fungi to seed, germinating seeds, seedlings and growing plants. Therefore, the compounds may be applied either directly or preferably in formulation to seeds or to the soil in which the seeds will be or have been planted. Soil applications may be broadcast over the entire area or made only in the furrows or bands in which the seeds are planted or in which the plants are growing. The compounds may be applied in any of the formulations described above. They may be applied to the surface of the soil and then tilled in; in the furrow in which the seed is to be planted; as a side-dressing; or as a soil drench.

Generally the dosage per hectare which should be applied depends upon the method of application and soil type and varies from ¼ to 100 kg./ha. In-furrow applications are effective and economical and generally require ½ to 5 kg./ha. of these compounds in a 5 centimeter band. Correspondingly more chemical is needed if broader bands are treated. This treatment is equivalent to using ½–5 kg./ 9000 meters of row when rows are spaced about 1 meter apart. Seed treatments require from about ¼ to 1½ kg./ 100 kg. of seed. The amount used is determined by the degree of protection desired and the amount of material that the seed will hold. Broadcast treatments require 10–100 kg./ha. and soil drench treatments about 10–60 kg./ha.

These treatments are useful for protecting such crops as cotton, beans, peanuts, tobacco, cabbage, cucumber, watermelon, cantelope, and squash from attack by many fungi. Among the fungi controlled are: *Rhizoctonia spp.*; *Thielaviopsis basicola*; *Fusarium spp.* (both stem and root rotting types); and *Sclerotium spp.*

Compounds of Formua I can also be mixed with cotton seeds in the hopper box treatment at planting time at rates of .07–4.0 kg./100 kg. of seed to give protection from soil fungi.

Compositions of this invention and methods of application are further described by Examples 1–14 which follow. In the examples all percentages given are by weight unless otherwise specified.

EXAMPLE 1

The product of Example I is dissolved in acetone and applied to soil inoculated with *Rhizoctonia solani*. The compound is mixed to a depth of about two inches and cotton seeds are planted. Germination is checked after one week. Based on the germination of the seeds, the product of Example I gives 100% control of the fungus at 4.0 lb./ acre (approx. 4.5 kg./ha.) and 70% control at 2.0 lb./ acre (approx. 2.25 kg./ha.). No phytotoxicity is observed.

EXAMPLE 2

| | Percent |
|---|---|
| 1,1,-diethoxy-2,5-dinitro-2,3,4,5-tetrachloro-3-cyclopentene | 25 |
| Alkylated naphthalene | 70 |
| Mixed polyoxyethylene ethers and oil soluble sulfonates | 5 |

The active ingredient and the emulsifiers are added to the alkylated naphthalene in an agitated steam-jacketed vessel. The mixture is heated and agitated until homogeneous, then emulsified in water. The emulsion is sprayed in an open furrow in soil infested with *Rhizoctonia solani*. The rate of application is one kg./ha. of active ingredient. Bean seeds are planted in the furrow immediately after treatment, and the furrow is closed. The substituted cyclopentene protects the bean seedlings and plants from attack by the fungus.

EXAMPLE 3

| | Percent |
|---|---|
| 1,1 - ethylenedioxy-2,5-dinitro-2,3,4,5-tetrachloro-3-cyclopentene | 10 |
| Micaceous talc | 90 |

The ingredients are blended and ground in a hammer mill to provide a homogeneous free-flowing finely divided dust. Ten kg. of this dust is mixed with one hundred kg. of machine-delinted cotton seed for hopper-box application at planting time. The seeds are planted in soil infested with *Rhizoctonia spp*. The seeds germinate, and the substituted cyclopentene protects the seedlings and plants from attack by the fungus.

Any of the compounds of Formula I above can be substituted for the 1,1-ethylenedioxy-2,5-dinitro-2,3,4,5-tetrachloro-3-cyclopentene in the formulation of this example.

EXAMPLE 4

| | Percent |
|---|---|
| 1,1 - dimethoxy - 2,5 - dinitro - 2,3,4,5-tetrachloro-3-cyclopentene | 37.5 |
| Dexon® para-dimethylaminobenzenediazo sodium sulfonate | 37.5 |
| Synthetic fine silica | 10 |
| Fuller's earth | 12.5 |
| Sodium dioctyl sulfosuccinate | 0.5 |
| Sodium lignin sulfonate | 2.0 |

The above ingredients are blended and ground in a hammer mill to obtain a homogeneous mixture in which substantially all particles are 50 microns or less. Cucumber seeds are moistened with water and then tumbled with this formulation at a rate of 1 kg. of formulation per 100 kg. of seeds. The seeds are planted in soil infested with *Rhizoctonia spp.* and *Pythium spp*. The substituted cyclopentene protects the plants from attack by the *Rhizoctonia*, and the Dexon® protects them from attack by the *Pythium*.

EXAMPLE 5

| | Percent |
|---|---|
| 1,1 - dimethoxy - 2,5 - dinitro - 2,3,4,5-tetrachloro-3-cyclopentene | 50 |
| Kaolinite clay | 47 |
| Methyl cellulose, low viscosity | ½ |
| Alkyl naphthalene sulfonic acid, sodium salt | 1½ |
| Anhydrous disodium phosphate | 1 |

The ingredients are dry blended in a ribbon blender until a homogeneous mixture is obtained. The mixture is then micropulverized until all the particles have a particle size substantially less than 50 microns. This formulation is diluted with water and sprayed in an open furrow in soil infested with *Sclerotium rolfsii*. Peanuts are planted in the treated furrow at the same time the treatment is made, and the furrow is closed. The peanuts germinate, and the seedlings and growing plants are protected from the fungus.

EXAMPLE 6

A formulation is prepared as in Example 4, except that the Dexon® is replaced with an equal weight of 1,1-dimethoxy-2,5-dinitro-2,3,4,5-tetrachloro - 3 - cyclopentene. The powder is mixed with water and rotovated into soil infested with *Thielaviopsis basicola*. The rate of application is 30 kg./ha. of the active ingredient. Tobacco seedlings planted in the soil are protected from attack by the fungus.

EXAMPLE 7

| | Percent |
|---|---|
| 1,1 - dimethoxy-2,5-dinitro-2,3,4,5-tetrachloro-3-cyclopentene | 30 |
| 1,2-dibromo-3-chloropropane | 20 |
| Alkylated naphthalene | 45 |
| Mixed polyoxyethylene ethers and oil soluble sulfonates | 5 |

A water emulsion of the above ingredients is prepared in a manner similar to that described in Example 2. The emulsion is rotovated into soil infested with *Rhizoctonia spp., Fusarium oxysporum* f. *vasinfectum*, and *Meloidogyne spp.* (root knot nematodes). Rate of application is 100 kg. of the formulation per hectare. Cotton planted in the treated soil is protected from the fungi by the substituted cyclopentene and from the nematodes by the 1,2-dibromo-3-chloropropane.

EXAMPLE 8

| | Percent |
|---|---|
| 1,1 - diethoxy - 2,5 - dinitro - 2,3,4,5-tetrachloro-3-cyclopentene | 50 |
| Parathion | 5 |
| Synthetic fine silica | 10 |
| Fuller's earth | 22½ |
| Sodium dioctyl sulfosuccinate | ½ |
| Sodium lignin sulfonate | 2 |

This formulation is prepared in a manner similar to that used in preparing the formulation of Example 4. The wettable powder is rotovated into soil infested with *Fusarium oxysporum* f. *vasinfectum*, at a rate of 30 kg./ha. of the substituted cyclopentene. Cotton planted in the soil is protected from the fungus by the substituted cyclopentene and from insects by the parathion.

EXAMPLE 9

| | Percent |
|---|---|
| 1,1-ethylenedioxy-2,5-dinitro - 2,3,4,5 - tetrachloro-3-cyclopentene | 5 |
| Attapulgite clay | 15 |
| Kaolinite clay | 80 |

The substituted cyclopentene is blended with the attapulgite and ground in a hammer mill to obtain a concentrate. The kaolinite is then blended in, and the blend is dusted onto the surface of soil infested with *Rhizoctonia solani*, at a rate of 100 kg. of active ingredient per hectare. The soil is then disced to a depth of about 10 centimeters and bean seeds are planted in the usual fashion. The seeds germinate, and the seedlings and growing plants are protected from the fungus.

EXAMPLE 10

| | Percent |
|---|---|
| 1,1 - dimethoxy-2,5-dinitro-2,3,4,5-tetrachloro-3-cyclopentene | 2 |
| Alkylated naphthalene | 4 |
| Polyoxyethylated alkyl phenol | 1 |
| Clay granules (−15 +30 mesh) | 93 |

The first three ingredients form a homogeneous solution, and this is sprayed over the surface of the clay granules. The granules are rotovated into soil infested with *Rhizoctonia solani*, at a rate of 60 kg./ha. of active ingredient. Cucumbers planted in this soil are protected from attack by the fungus.

What is claimed is:
1. A method of controlling soil fungi which comprises applying to seeds or to soil in which seeds are planted a fungicidally effective amount of the compound of the following structure:

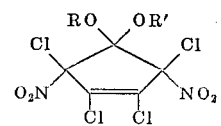

wherein: R and R' taken separately can be the same or different and are alkyl of 1 through 8 carbon atoms, allyl or benzyl; or taken together are ethylene.

2. Method of claim 1 wherein the compound is 1,1-dimethoxy-2,5-dinitro-2,3,4,5-tetrachloro-3-cyclopentene.

3. Method of claim 1 wherein the compound is 1,1-diethoxy-2,5-dinitro-2,3,4,5-tetrachloro-3-cyclopentene.

4. Method of claim 1 wherein the compound is 1,1-ethylenedioxy-2,5-dinitro-2,3,4,5-tetrachloro-3 - cyclopentene.

5. A fungicidal composition comprising a fungicidally effective amount of a compound of the formula:

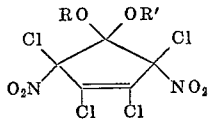

wherein: R and R' taken separately can be the same or different and are alkyl of 1 through 8 carbon atoms, allyl or benzyl; or taken together are ethylene and an inert diluent.

6. A fungicidal composition of claim 5 containing a surface active agent.

7. A composition of claim 5 in which the compound is 1,1-dimethoxy-2,5-dinitro-2,3,4,5-tetrachloro - 3 - cyclopentene.

8. A composition of claim 5 in which the compound is 1,1-diethoxy-2,5-dinitro - 2,3,4,5 - tetrachloro-3-cyclopentene.

9. A composition of claim 5 in which the compound is 1,1 - ethylenedioxy - 2,5 - dinitro-2,3,4,5-tetrachloro-3-cyclopentene.

References Cited
UNITED STATES PATENTS 2,697,103  12/1954  Ordas _____ 424—339 X
3,358,039  12/1967  Chang _____ 260—611

ALBERT T. MEYERS, Primary Examiner

D. J. FUNDERBURK, Assistant Examiner

U.S. Cl. X.R.

424—339